Aug. 28, 1951  R. A. HOWARD  2,565,922
HIGH-FREQUENCY THERMISTOR WATTMETER
Filed March 7, 1946
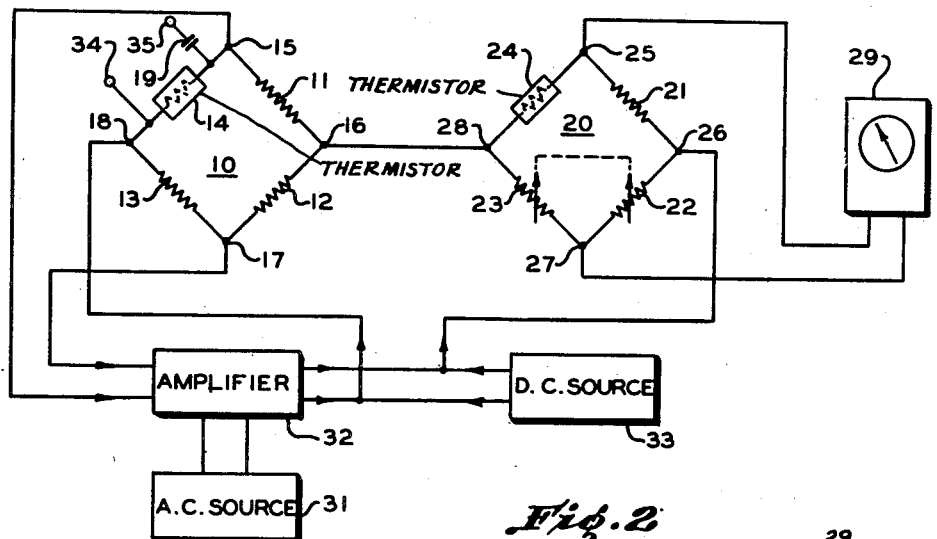
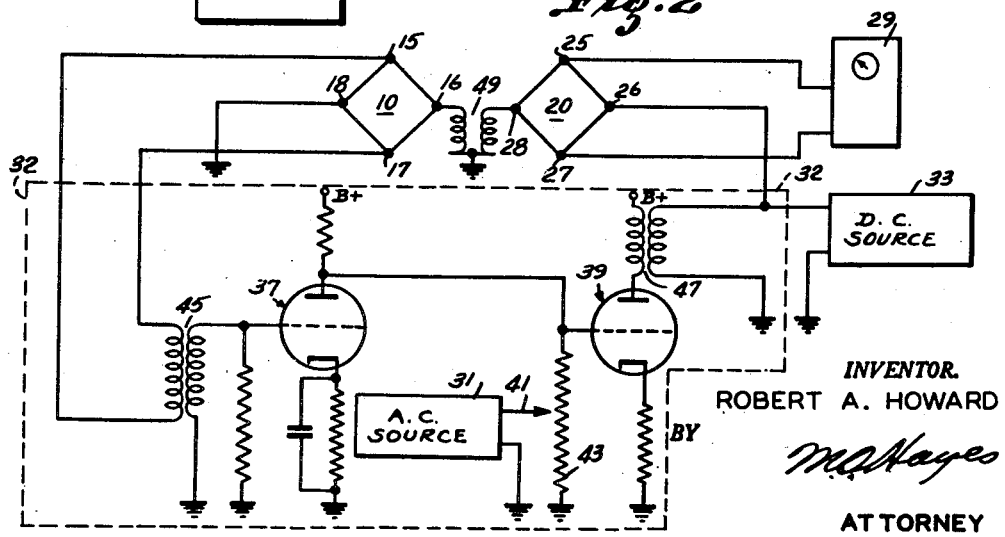
INVENTOR.
ROBERT A. HOWARD
BY
M. Q. Hayes
ATTORNEY Patented Aug. 28, 1951

2,565,922

UNITED STATES PATENT OFFICE 2,565,922

HIGH-FREQUENCY THERMISTOR WATTMETER

Robert A. Howard, Pasadena, Calif., assignor, by mesne assignments, to the United States of America as represented by the Secretary of the Navy Application March 7, 1946, Serial No. 652,519

13 Claims. (Cl. 171—95)

This invention relates to radio frequency power measurement and more specifically to a thermistor bridge radio frequency power meter.

An indication of the power in a radio frequency system may be obtained by dissipating a small percentage of the power in a temperature sensitive resistor and providing a system for measuring the resistance change of the resistor. Several resistance measuring bridges have been used for this purpose, but they have an inherent error due to the change in resistance of the sensitive resistor with ambient temperature.

The object of the present invention is to generally improve radio frequency power measurement systems by eliminating the above mentioned difficulty.

Another object is to provide a temperature sensitive bridge which is compensated for ambient temperature changes.

These and other objects will be better understood from the following description when considered with the accompanying drawing, in which:

Fig. 1 is a schematic diagram partially in block form of one embodiment of the present invention, and Fig. 2 is a schematic diagram showing in greater detail a slightly modified embodiment of the present invention.

Referring now to Fig. 1 of the drawing, resistance bridge 10 is formed of three fixed resistors 11, 12, and 13 and a temperature sensitive resistor 14. Sensitive resistor 14 is supplied through capacitor 19 with a fraction of the radio frequency energy to be measured. A second resistance bridge 20 is formed of fixed resistor 21, two equal and simultaneously variable resistors 22 and 23, and a temperature sensitive resistor 24. Bridges 10 and 20 are connected in series by the connections 18, 16, 28, and 26. An alternating current source 31, preferably over 1000 cycles, supplies a voltage to controlled amplifier 32. Amplifier 32 has a second input, a control voltage from connections 15 and 17 of bridge 10. The output of amplifier 32 supplies an alternating current to bridges 10 and 20 in series through connections 26 and 18. A regulated direct current source 33 supplies a direct current to bridges 10 and 20 in series through connections 26 and 18. Suitable isolation is provided for direct current in the input and output circuits of amplifier 32, and for alternating current in the output circuit of direct current source 33. A direct current voltmeter 29 is connected to bridge 20 through connections 25 and 27.

Temperature sensitive resistors 14 and 24 may be thermistors, the sensitive element of which is a composition containing nickel, cobalt, and manganese. The resistance of a thermistor decreases with an increase in temperature in approximately an exponential manner. When a thermistor is used as sensitive resistor 14, the radio frequency energy to be measured may be supplied through capacitor 19 from terminals 34 and 35, or the thermistor may be inserted transversely in a section of wave guide carrying the power to be measured.

Fig. 2 illustrates in greater detail the amplifier circuit 32 of Fig. 1. As shown in Fig. 2, amplifier 32 includes two conventional amplifier stages 37 and 39. The signal from alternating current source 31 is coupled to an adjustable tap 41 on the grid resistor 43 of amplifier stage 39. The signal from stage 37 will be either in phase or out of phase with the signal from alternating current source 31 depending on the direction of unbalance of bridge 10. The magnitude of the signal from stage 37 will depend on the magnitude of unbalance of bridge 10. Isolation for direct current is provided by input transformer 45 and output transformer 47.

Bridges 10 and 20 which are illustrated only diagrammatically in Fig. 2 are identical to the correspondingly numbered bridges of Fig. 1.

In the operation of the circuit of Fig. 1, with no radio frequency energy input to sensitive resistor 14, sensitive resistors 14 and 24 will be at the same temperature and resistance. The temperature of sensitive resistors 14 and 24 will be determined by three factors; the ambient temperature, the heating due to the flow of direct current, and the heating due to the flow of alternating current from amplifier 32. As bridges 10 and 20 are electrically identical and in series, the currents flowing in sensitive resistors 14 and 24 will be equal. Thus bridges 10 and 20 will have the same degree of balance.

Controlled amplifier 32 acts to maintain bridge 10 near its initial balance condition. Any change in temperature of sensitive resistor 14 will change the balance condition of bridge 10, which, in turn, varies the alternating voltage present between connections 15 and 17. This variation in the input voltage applied to amplifier 32, causes a change in the alternating current supplied to bridges 10 and 20, which will effect the heating of sensitive resistor 14 in such a manner as to cause it to return to substantially its initial temperature. Bridge 10 will thus be returned to its initial balance conditions.

Ambient temperature will effect sensitive resistors 14 and 24 equally. It will be compensated for by a change in alternating current, as described above, which will also effect sensitive resistors 14 and 24 equally.

Now if the radio frequency energy to be measured is applied to sensitive resistor 14, it will be dissipated causing heating of resistor 14. The heating of sensitive resistor 14 will be neutralized by the action of amplifier 32 as described previously. The alternating current supplied by amplifier 32 will be reduced sufficiently to return sensitive resistor 14 to substantially its initial temperature. This reduction in alternating current will reduce the heating of sensitive resistor 24 and thus unbalance bridge 20. With bridge 20 unbalanced a direct current potential will be present between connections 25 and 27, which will cause direct current meter 29 to deflect. This deflection of meter 29 will be proportional to the radio frequency energy applied to sensitive resistor 14, and meter 29 may be calibrated in terms of power.

If sensitive resistors 14 and 24 are slightly different in their temperature resistance characteristics, the difference may be compensated for by variable resistors 22 and 23. These resistors 22 and 23 are variable by a common control and are always equal. This adjustment affects the division of the currents between the two sections of bridge 20 causing more or less of the total current to flow through sensitive resistor 24, while still maintaining the balance conditions of bridge 20.

It will be evident that many other systems may be used to indicate the unbalance of bridge 20. It would be possible to control the direct current to bridge 20 only, so as to introduce only enough direct current to return the bridge to balance. Isolation between bridges 10 and 20 is provided by transformer 49 of Fig. 2. Transformer 49 couples the alternating current signal from bridge 20 to bridge 10 but the direct current from source 33 is confined to bridge 20. This could be done manually or by a controlled amplifier such as used on the alternating current. The direct current supplied to balance bridge 20 would then be a measure of the radio frequency power applied to sensitive resistor 14.

It is to be understood that this invention is not limited to the details of construction and operation illustrated in the accompanying drawing and described above, except as appears hereafter in the claims.

What is claimed is:

1. An electrical bridge apparatus for measuring temperature changes comprising, a first resistance bridge having three fixed resistors and a temperature sensitive resistor, said temperature sensitive resistor adapted to be controlled by the temperature changes to be measured, a second resistance bridge substantially identical to said first resistor bridge, an alternating current source, an alternating current amplifier, said alternating current source coupled to said amplifier, said amplifier coupled to said first and second resistance bridges so as to supply current equally to each of said bridges, a means for controlling the current supplied by said amplifier to maintain said first resistance bridge substantially at balance, and a means for indicating the unbalance of said second resistance bridge.

2. An electrical bridge apparatus for measuring temperature changes comprising, a first conventional resistance bridge circuit formed by three fixed resistors and a first thermistor, said first thermistor adapted to be responsive to the temperature changes to be measured, a second conventional resistance bridge circuit formed by a fixed resistor, two variable resistors, and a second thermistor, an alternating current source, a controlled alternating current amplifier having a first input from said alternating current source, and a second input connecting to said first bridge, the output of said amplifier supplying alternating current to said first and second bridges in series, said output being controlled by said second input to maintain said first bridge at balance, and a means for indicating the degree of unbalance of said second bridge.

3. An ambient temperature compensated thermistor bridge for radio frequency power measurement comprising, a first conventional resistance bridge circuit formed by three fixed resistors and a first thermistor, said bridge having two input and two output terminals, said first thermistor adapted to be responsive to the radio frequency power to be measured, a second conventional resistance bridge circuit formed by a fixed resistor, two variable resistors, and a second thermistor, said second bridge having two input and two output terminals, said variable resistors joining said input terminals to one of said output terminals of said second bridge, an alternating current source, an alternating current amplifier having a first input from said alternating current source, and a second input connecting to said output terminals of said first bridge, the output of said amplifier supplying alternating current to said first and said second bridges in series through said input terminals of said bridges, the output of said amplifier being controlled by said second input to maintain said first bridge at balance, and a means for indicating the degree of unbalance of said second bridge, said second thermistor compensating for effect of ambient temperature on said first thermistor.

4. An ambient temperature compensated thermistor bridge for radio frequency power measurement comprising, a first conventional resistance bridge circuit formed by three fixed resistors and a first thermistor, said bridge having two input and two output terminals, said first thermistor adapted to be responsive to the radio frequency power to be measured, a second conventional resistance bridge circuit formed by a fixed resistor, two variable resistors and a second thermistor, said second bridge having two input and two output terminals, said variable resistors joining said input terminals to one of said output terminals of said second bridge, an alternating current source, an alternating current amplifier having a first input from said alternating current source, and a second input from said output terminals of said first bridge, the output of said amplifier supplying alternating current to said first and said second bridges in series through said input terminals of said bridges, said output of said amplifier being controlled by said second input to maintain said first bridge at balance, a direct current source connecting to said input terminals of said second bridge, and a direct current meter connecting to said output terminals of said second bridge for indicating the degree of unbalance thereof, said second thermistor compensating for effect of ambient temperature on said first thermistor.

5. An energy measuring apparatus comprising a first four-terminal bridge having three fixed resistors and a temperature sensitive resistor, means for coupling energy to be measured to said temperature sensitive resistor to change the temperature thereof, a second four-terminal bridge substantially identical to said first bridge, a source of electrical energy, said source being coupled to said two bridges so as to supply equal amounts of energy thereto, means controlling the energy supplied to said two bridges from said source to maintain said first bridge substantially at balance and means for indicating the unbalance of said second bridge.

6. An energy measuring apparatus comprising a first four-terminal bridge having three fixed resistors and a temperature sensitive resistor, means for coupling energy to be measured to said temperature sensitive resistor to change the temperature thereof, a second four-terminal bridge substantially identical to said first bridge, a source of electrical energy, means coupling said source to said first and second bridges in series, means responsive to the output of said first bridge for controlling said source to maintain at a substantially constant value the sum of the energy supplied to said temperature sensitive element of said first bridge from said source and from said energy to be measured, and means for indicating the unbalance of said second bridge.

7. An energy measuring apparatus comprising a first four-terminal bridge having three fixed resistors and a temperature sensitive resistor, means for coupling energy to be measured to said temperature sensitive resistor to change the temperature thereof, a second four-terminal bridge substantially identical to said first bridge, a source of electrical energy, a controlled amplifier having a first input from said source, and a second input connecting to said first bridge, said amplifier providing an increased output for a first direction of unbalance of said bridge and a decreased output for an opposite direction of unbalance of said bridge, means coupling the output of said amplifier to said two bridges in series in a direction to maintain said first bridge at balance, and means for indicating the degree of unbalance of said second bridge.

8. An energy measuring apparatus comprising a first four-terminal bridge formed by three fixed resistors and a first temperature sensitive resistor, means for coupling energy to be measured to said temperature sensitive resistor to change the temperature thereof, a second conventional resistance bridge circuit formed by three resistors and a temperature sensitive resistor, at least one of said three last-mentioned resistors being adjustable to match the ambient temperature sensitivity of said second bridge to the ambient temperature sensitivity of said first bridge, a source of electrical energy, a controlled amplifier having first input from said source and a second input connecting to said first bridge, said amplifier providing an increased output for a direction of unbalance of said first bridge indicating a decrease of energy to said temperature sensitive resistor, and a decreased output for an unbalance of said first bridge indicating an increase of energy to said temperature sensitive element, means coupling the output of said amplifier to said two bridges in series in a direction to maintain said first bridge at balance, and means for indicating the degree of unbalance of said second bridge.

9. An ambient temperature compensated thermistor bridge for radio frequency power measurement comprising, a first conventional resistance bridge circuit formed by three fixed resistors and a first thermistor, said bridge having two input and two output terminals, said first thermistor adapted to be responsive to the radio frequency power to be measured, a second conventional resistance bridge circuit formed by a fixed resistor, two variable resistors, and a second thermistor, said second bridge having two input and two output terminals, said variable resistors joining said input terminals to one of said output terminals of said second bridge, an alternating current source, an alternating current amplifier having a first input from said alternating current source, and a second input connecting to said output terminals of said first bridge, said amplifier providing an increased output for a direction of unbalance of said first bridge indicating a decrease of energy to said thermistor and a decreased output for an unbalance of said first bridge indicating an increase of energy to said thermistor, the output of said amplifier supplying alternating current to said first and said second bridges in series through said input terminals of said bridges, and means for indicating the degree of unbalance of said second bridge, said second thermistor compensating for effect of ambient temperature on said first thermistor.

10. An ambient temperature compensated thermistor bridge for radio frequency power measurement comprising, a first conventional resistance bridge circuit formed by three fixed resistors and a first thermistor, said bridge having two input and two output terminals, said first thermistor adapted to be responsive to the radio frequency power to be measured, a second conventional resistance bridge circuit formed by a fixed resistor, two variable resistors, and a second thermistor, said second bridge having two input and two output terminals, said variable resistors joining said input terminals to one of said output terminals of said bridge, an alternating current amplifier comprising two amplifier stages in cascade, means coupling the input of said first stage to the output terminals of said first bridge, an alternating current source coupled to the input of said second stage, means coupling the output of the second stage to said first and second bridges in series through said input terminals of said bridges, the output of said amplifier being controlled by said input to said first stage to maintain said first bridge at balance, and means for indicating the degree of unbalance of said second bridge, said second thermistor compensating for the effect of ambient temperature on said first thermistor.

11. An energy measuring apparatus as in claim 8, said apparatus further comprising a second adjustable source of energy coupled to said second bridge for restoring the balance of said second bridge.

12. Radio frequency measuring apparatus as in claim 9 wherein said means for measuring the unbalance of said second bridge is responsive to direct current signals, said apparatus further comprising a source of direct current connected to said two bridges in series through said input terminals.

13. Radio frequency measuring apparatus as in claim 9 wherein said means for measuring the unbalance of said second bridge is responsive to direct current, said apparatus further comprising an adjustable source of direct current coupled to the input terminals of said second bridge for restoring the balance of said second bridge.

ROBERT A. HOWARD.

REFERENCES CITED

The following references are of record in the file of this patent:

UNITED STATES PATENTS

| Number | Name | Date |
| --- | --- | --- |
| 1,379,266 | Keeler | May 24, 1921 |
| 1,472,125 | Keeler | Oct. 30, 1923 |
| 2,366,618 | Harrison | Jan. 2, 1945 |
| 2,398,606 | Wang | Apr. 16, 1946 |
| 2,399,481 | George | Apr. 30, 1946 |